United States Patent Office 3,491,135
Patented Jan. 20, 1970

3,491,135
PAMOATES OF (3-CYCLOHEXYL-3-HYDROXY-3-PHENYLPROPYL) TRIETHYLAMMONIUM HAVING UNOBJECTIONABLE FLAVORS
James E. Krueger, New City, and William Charles Barringer, Pearl River, N.Y., and Norman L. Henderson, Park Ridge, N.J., assignors to American Cyanamid Company, Stamford, Conn., a corporation of Maine
No Drawing. Continuation-in-part of application Ser. No. 635,395, May 2, 1967. This application Mar. 3, 1969, Ser. No. 803,968
Int. Cl. C07f 5/06; A61k 27/00; C07c 87/30
U.S. Cl. 260—448　　　　　　　　　　　　　8 Claims

ABSTRACT OF THE DISCLOSURE

Salts of (3 - cyclohexyl - 3 - hydroxy - 3 - phenylpropyl) triethylammonium ion and pamoic acid and preferably salts which include a physiologically acceptable polyvalent metal. The salts show little or none of the extremely bitter tastes of the ordinary drug in its normal form of halides such as chloride or iodide. The products are all substantially nonhydroscopic.

RELATED APPLICATIONS

This application is a continuation-in-part of our prior application Ser. No. 635,395, filed May 2, 1967, which is now abandoned.

BACKGROUND OF THE INVENTION

3 - cyclohexyl - 3 - hydroxy 3 - phenylpropyl triethylammonium halide, which has the following formula

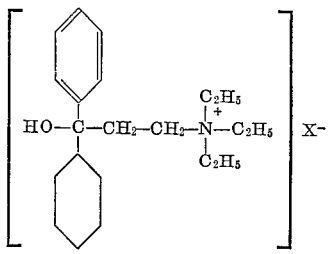

in which X is a halogen, such as chlorine, has an extremely bitter taste, which is very unpleasant. It has been impractical to incorporate the drug in syrups, chewable tablets, and the like, and so the use of this very valuable anticholinergic drug has been seriously limited in its form. There are no known flavorings or masking agents which sufficiently mask the unpleasant bitter taste so that oral preparations, in which taste is important, have not been practical in the past. The drugs are also highly hygroscopic.

SUMMARY OF THE INVENTION

The unpleasant bitter taste of 3-cyclohexyl-3-hydroxyl-3-phenylpropyl triethylammonium halide is reduced to tolerable level and in a preferred embodiment substantially eliminated by making salts of the quaternary cation with pamoic acid and for maximum relief from the bitter taste salts which also include a physiologically acceptable polyvalent metal.

When straight pamoates are produced, there is usually some residue of bitter taste, but it is so greatly reduced that it is tolerable for certain uses, for example in veterinary medicine. When, however, the salts are made up with pamoic acid and both the 3-cyclohexyl-3-hydroxy-3-phenylpropyl triethylammonium cation and a polyvalent metal salt, the bitter taste is still further reduced and in fact in the preferred embodiments practically eliminated, so that it now becomes practical to supply the drug in formulations where taste is a serious matter, such as syrups, chewable tablets, and the like. As these three component salts effect the greatest degree of removal of bitter taste, they constitute the preferred modifications of the present invention as they are useful for humans as well as other uses, such as veterinary uses. The particular polyvalent metal to be used is not sharply critical so long as it is physiologically acceptable. There is, however, a difference in completeness of removal of the bitter taste, and aluminum has been found to be the preferred polyvalent metal, although the invention, in its broader aspects, is not limited thereto and other physiologically acceptable polyvalent metals may be used, such as calcium, magnesium, and the like.

A wide variation in relative amounts of polyvalent metal, drug and pamoic acid is possible. Typical molar ratios of drug to metal to pamoic acid are 1:0:1; 1:1:1; 1:1:2; 2:0:1; 2:1:2; 3:2:3; and 3:1:3. Still larger amounts of pamoic acid and metal do not have any adverse effect, and of course intermediate, non-integral ratios are also useful.

The chemical formulae of the various compositions may be represented as follows:

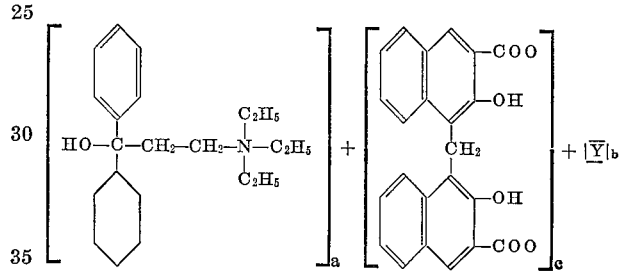

wherein

Y = a polyvalent metal
$a = 1, 2, \text{ or } 3$
$b = 0, 1, 2, \text{ or } 3$ and
$c = 1, 2, \text{ or } 3$
and $b$ is never larger than $c$.

It is an advantage of the present invention that the 3-cyclohexyl-3-hydroxy-3-phenylpropyl triethylammonium halide, which is the effective drug, is released readily by hydrolysis in the dilute hydrochloric acid medium of the gastric juice. In other words, the compositions of the present invention show the advantages of reduced or eliminated bitter taste without any loss in physiological effectiveness. The same desirable results on smooth muscle spasms in the gastro-intestinal tract, inhibition of gastric secretion by blocking action of acetylcholine, pain relieval in gastric and duodenal ulcers, and the like are still obtained with undiminished effectiveness.

The precise process of making the compositions is not critical, and it is not intended to limit the invention to any critical process steps. Typical, useful procedures will be described in examples of preferred embodiments, which will be described below.

DESCRIPTION OF THE PREFERRED EMBODIMENTS

Example 1

3-cyclohexyl-3-hydroxy-3-phenylpropyl triethylammonium aluminum pamoate (2:1:2)

To a solution of 30 g. (84 millimoles) of 3-cyclohexyl-3-hydroxy-3-phenylpropyl triethylammonium chloride in 750 ml. of n-propyl alcohol was added with stirring first 9.2 g. (45 mmoles) of aluminum isopropoxide and then 42 g. (90 millimoles) of monopotassium pamoate. After stirring the slurry for 5 hours the solid product was collected by filtration, washed by re-suspension in water, and dried in vacuo at 70° C.

The product obtained was essentially tasteless and useful in syrups, chewable tablets, and the like for human therapy. The product was substantially non-hygroscopic.

EXAMPLE 2

3-cyclohexyl-3-hydroxy-3-phenylpropyl triethylammonium aluminum pamoate (2:1:2)

One hundred grams (0.28 mole) of 3-cyclohexyl-3-hydroxy-3-phenylpropyl triethylammonium chloride and 140 g. (0.30 mole) of disodium pamoate were added to 2000 ml. of dimethylformamide and stirred for 16 hours. The reaction mixture was then filtered to remove the NaCl and 36 g. (0.15 mole) of $AlCl_3 \cdot 6H_2O$ was slowly added to the reaction mixture. The resulting yellow product was collected by filtration, washed twice by resuspension in water and dried. The crystalline product was essentially tasteless.

EXAMPLE 3

3-cyclohexyl-3-hydroxy-3-phenylpropyl triethylammonium aluminum pamoate (1:1:2)

A mixture of 5.0 g. (14 millimoles) of 3-cyclohexyl-3-hydroxy-3-phenylpropyl triethylammonium chloride and 14.0 g. (30 millimoles) of disodium pamoate in 150 ml. dimethylformamide was prepared and stirred until all of the reactants had dissolved (3–5 hours). The mixture was then filtered to remove the NaCl and 3.6 g. (15 millimoles) of $AlCl_3 \cdot 6H_2O$ added to the filtrate. The slurry was stirred for 16 hours after which 700 ml. of water was slowly added. The resulting crystalline yellow product was collected by filtration, washed with water and dried. The bitter taste was substantially absent.

EXAMPLE 4

3-cyclohexyl-3-hydroxy-3-phenylpropyl triethylammonium aluminum pamoate (3:2:3)

To a solution of 3.6 g. (0.01 mole) of 3-cyclohexyl-3-hydroxy-3-phenylpropyl triethylammonium chloride and 1.6 g. (0.0067 mole) of aluminum chloride hexahydrate in 50 ml. of water was added with stirring a solution of 4.3 g. (0.01 mole) of disodium pamoate in 50 ml. of water. An immediate yellow precipitate resulted. After stirring for about 18 hours the product was collected by filtration, washed with water, and dried in vacuo at 60° C. The product was substantially non-hygroscopic.

EXAMPLE 5

3-cyclohexyl-3-hydroxy-3-phenylpropyl triethylammonium aluminum pamoate (1:1:1)

To a solution of 3.6 g. (15 millimoles) of aluminum chloride hexahydrate in about 20 ml. of 5 N NaOH was added with stirring a solution of 7.0 g. (15 millimoles) of disodium pamoate in 100 ml. of water. The pH of the mixture was lowered to about 7.5 with concentrated HCl, causing a yellow precipitate to form. To this suspension was added a solution of 5.0 g. (14 millimoles) of 3 - cyclohexyl - 3 - hydroxy - 3 - phenylpropyl triethylammonium chloride dissolved in 100 ml. of water. The reaction mixture was stirred for one hour, aged for 3 days, and stirred for an additional hour. The solid product was then collected by filtration, washed by resuspension in water, and dried at room temperature. The product was substantially nonhygroscopic.

EXAMPLE 6

3-cyclohexyl-3-hydroxy-3-phenylpropyl triethylammonium aluminum pamoate (3:1:3)

To a solution of 5.4 g. (0.015 mole) of tridihexethyl chloride and 1.2 g. (0.005 mole) of aluminum chloride hexahydrate in 100 ml. of water was added with stirring 6.5 g. (0.015 mole) of disodium pamoate dissolved in 100 ml. of water. The resulting suspension was stirred for about two hours and the product then collected and dried. The product had a slightly more bitter taste than other 3 - cyclohexyl - 3 - hydroxy - 3 - phenylpropyl triethylammonium aluminum pamoates.

EXAMPLE 7

3-cyclohexyl-3-hydroxy-3-phenylpropyl triethylammonium pamoate (2:1)

To 3.6 g. (0.01 mole) of 3-cyclohexyl-3-hydroxy-3-phenylpropyl triethylammonium chloride dissolved in 30 ml. of water was added with stirring 2.16 g. (0.005 mole) of disodium pamoate dissolved in 30 ml. of water. A gummy product resulted which was collected by decantation, washed with water, and dried in vacuo at about 60° C. The resulting solid was ground to a powder. The product was considerably more bitter than the products of the preceding examples. However, the bitter taste was sufficiently reduced so that for some purposes, such as for example veterinary use, the taste is tolerable. The product was substantially nonhygroscopic.

EXAMPLE 8

3-cyclohexyl-3-hydroxy-3-phenylpropyl triethylammonium pamoate (1:1)

To 3.6 g. (0.01 mole) of 3-cyclohexyl-3-hydroxy-3-phenylpropyl triethylammonium chloride dissolved in 100 ml. of water was added with stirring 4.3 g. (0.01 mole) of disodium pamoate. After about one hour the mixture was neutralized with HCl and the resulting gummy product isolated by decantation. After washing with water the product was dried in vacuo at 60° C. and ground to powder. The taste was substantially similar to the product of Example 7. The product was substantially nonhygroscopic.

EXAMPLE 9

3-cyclohexyl-3-hydroxy-3-phenylpropyl triethylammonium pamoate (2:1) on $Al(OH)_3Mg_2Si_3O_8$ gel To a solution of 2.2 g. (0.005 mole) of disodium pamoate in 100 ml. of water was added 15 grams of $Al(OH)_3Mg_2Si_3O_8$ compressed gel. To this mixture was added 3.6 g. (0.01 mole) of 3-cyclohexyl-3-hydroxy-3-phenylpropyl triethylammonium chloride dissolved in 100 ml. water. The resulting mixture was stirred for about two hours and then filtered. The residue was washed three times with water and dried. This procedure avoided the problem of a gummy prouct. The product was substantially nonhygroscopic.

EXAMPLE 10

3-cyclohexyl-3-hydroxy-3-phenylpropyl triethylammonium calcium pamoate (1:1:1)

To an aqueous solution of 432 mg. (1.0 millimole) of disodium pamoate was added with stirring, an aqueous solution of 148 mg. (1.0 millimole) of calcium chloride dihydrate. To the resulting cloudy mixture was added an aqueous solution of 360 mg. (1.0 millimole) of 3-cyclohexyl-3-hydroxy-3-phenypropyl triethylammonium chloride which resulted in the immediate precipitation of solid product. The pH of the reaction mixture was raised to about 10 with NaOH and the product collected, washed with water and dried. The product was resuspended in water and aged on a steam bath for 6 hours. After cooling, the crystalline product was collected and dried.

This product was not quite as tasteless as that of Examples 1 to 3 but was far superior to the products of Examples 7, 8 and 9, and was sufficiently reduced in bitterness to be useful in humans. The product was substantially nonhygroscopic.

EXAMPLE 11

Chewable 3-cyclohexyl-3-hydroxy-3-phenylpropyl triethylammonium aluminum pamoate antacid tablets For 1000 tablets:

|  | G. |
|---|---|
| Aluminum hydroxide magnesium-trisilicate co-dried gel | 500.0 |
| Mannitol | 375.0 |
| Sucrose, powdered | 75.0 |

Mix well and granulate through a No. 8 screen using a solution of:

| Soluble corn starch | 20.0 |
|---|---|
| Sucaryl sodium | 13.5 |
| Saccharin sodium | 1.5 |
| Water (50° C.) | 200.0 |

Dry at 120° F. Pass dried granulation through a No 16 screen.

Add and mix well with the following:

| 3-cyclohexyl-3-hydroxy - 3 - phenylpropyl triethylammonium aluminum pamoate (2:1:2) | 45.5 |
|---|---|
| Spearmint flavor (dry) | 5.0 |
| Peppermint flavor (dry) | 12.0 |
| Magnesium stearate | 11.0 |
| Blue Lake FD & C #1 | 5.0 |

Compress tablets using ⅝" flat faced bevel punch. Each tablet weighs 1.062 g.

The resultant tablet had an acceptable taste when chewed and swallowed.

EXAMPLE 12

Chewable 3-cyclohexyl-3-hydroxy-3-phenylpropyl triethylammonium aluminum pamoate tablets For 1000 tablets:

|  | G. |
|---|---|
| 3-cyclohexyl-3-hydroxy - 3 - phenylpropyl triethylammonium aluminum pamoate (1:1:2) | g__ 91 |
| Mannitol | g__ 180 |
| Sucrose, powdered | g__ 30 |

Blend well and granulate through a No. 8 screen using:

| Polyvinylpyrrolidone | g__ 9 |
|---|---|
| Alcohol, isopropyl | ml__ 75 |
| Blue dye FD & C #1 | g__ 0.4 |

Dry at 100 F. Pass dried granulation through a No. 16 screen.

Add and mix well with the following:

| Peppermint flavor (dry) | g__ 3 |
|---|---|
| Spearmint flavor (dry) | g__ 0.3 |
| Magnesium stearate | g__ 3 |

Compress tablets, using ⅜" flat faced bevel punches. Each tablet weighs 0.3167 g.

The resultant tablets had an acceptable flavor when chewed and swallowed.

EXAMPLE 13

Antidiarrheal suspension with 3-cyclohexyl - 3 - hydroxy-3-phenylpropyl triethyl ammonium aluminum pamoate Ingredients:

| Kaolin (6.0 g. per 30 ml.) ____percent w./v__ | 20 |
|---|---|
| Pectin NF (0.3 g. per 30 ml.) _____do____ | 1.0 |
| 3-cyclohexyl-3-hydroxy-3-phenylpropyl triethylammonium aluminum pamoate, 2:1:2 (25.0 mg. per 30 ml.) ____percent w./v__ | 0.372 |
| Potassium sorbate _____do____ | 0.2 |
| Glycerin _____do____ | 5.0 |
| Water _____v./v__ | 49.0 |
| Kola flavor _____v./v__ | 0.44 |
| Dibasic ammonium phosphate _percent w./v__ | 0.098 |
| Monobasic ammonium phosphate ____do____ | 0.123 |
| Liquid sucrose _____v./v__ | 42 |

EXAMPLE 14

Antidiarrheal suspension with 3-cyclohexyl-3-hydroxy-3-phenylpropyl triethlammonium aluminum pamoate with neomycin formula Ingredients:

| Kaolin (6.0 g. per 30 ml.) ____percent w./v__ | 20.0 |
|---|---|
| Pectin NF (0.3 g. per 30 ml.) _____do____ | 1.0 |
| 3-cyclohexyl-3-hydroxy - 3 - phenylpropyl triethylammonium aluminum pamoate, 3:2:3, (25.0 mg. per 30 ml.) ____percent w./v__ | 0.372 |
| Neomycin sulfate (300.0 mg. per 30 ml.) percent w./v__ | 1.18 |
| Potassium sorbate _____do____ | 0.2 |
| Glycerin _____do____ | 5.0 |
| Water _____v./v__ | 49.0 |
| Kola flavor _____v./v__ | 0.44 |
| Dibasic ammonium phosphate _percent w./v__ | 0.098 |
| Monobasic ammonium phosphate ____do____ | 0.098 |
| Liquid sucrose _____v./v__ | 42.0 |

EXAMPLE 15

Hydrolysis of 3-cyclohexyl-3-hydroxy-3-phenylpropyl triethylammonium aluminum pamoate 3 - cyclohexyl - 3 - hydroxy - 3 - phenylpropyl triethylammonium aluminum pamoate (2:1:2) suspended in 0.1 N HCl, was agitated at room temperature. Samples were removed and assayed at intervals to determine the percentage of the total tridihexethyl halide which was found in solution.

Hours (3-cyclohexyl-3-hydroxy-3-phenylpropyl triethylammonium halide released): Percent
1 _____ 73
2 _____ 97

The above release rate is evidence that the 3-cyclohexyl-3-hydroxy-3-phenylpropyl triethylammonium halide becomes rapidly available to the patient from the mixed salt dosage form.

We claim:

1. A compound having the formula

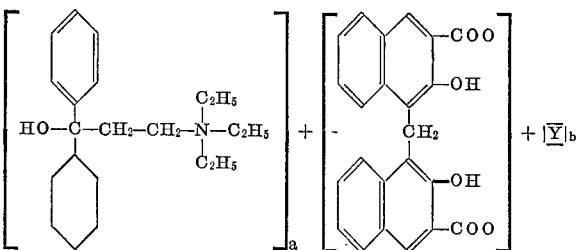

wherein

Y = a physiologically acceptable polyvalent metal selected from groups IIA and IIIA of the periodic system,
$a = 1, 2,$ or $3$
$b = 0, 1, 2,$ or $3$, and
$c = 1, 2,$ or $3$,
$b$ never being greater than $c$.

2. A compound according to claim 1 in which Y is aluminum.

3. A compound according to claim 2 in which the ratio $a:b:c$ is 1:1:1.

4. A compound according to claim 2 in which the ratio $a:b:c$ is 1:1:2.

5. A compound according to claim 2 in which the ratio $a:b:c$ is 2:1:2.

6. A compound according to claim 2 in which the ratio $a:b:c$ is 3:2:3.

7. A compound according to claim 1 in which Y is calcium.

8. A compound according to claim 7 in which $a:b:c$ is 1:1:1.

References Cited

UNITED STATES PATENTS

| | | | |
|---|---|---|---|
| 2,913,494 | 11/1959 | Lobby. | |
| 3,149,159 | 9/1964 | Kaiser et al. | 260—501.1 XR |
| 3,207,779 | 9/1965 | Cutler et al. | 260—448 XR |
| 3,308,159 | 3/1967 | Doebel | 260—501.1 XR |
| 3,223,720 | 12/1965 | Casadio | 260—448 |
| 3,372,177 | 3/1968 | Granatek | 260—448 |

FOREIGN PATENTS

| | | |
|---|---|---|
| 609,454 | 9/1948 | Great Britain. |
| 627,139 | 7/1949 | Great Britain. |

TOBIAS E. LEVOW, Primary Examiner

H. M. S. SNEED, Assistant Examiner

U.S. Cl. X.R.

260—501.15; 424—287, 329